July 16, 1963  G. A. LALAK  3,097,621
BRAZING JIG FOR ELECTRON TUBE FABRICATION

Filed June 13, 1960  2 Sheets-Sheet 1

INVENTOR.
George A. Lalak
BY
*William A. Zalesak*
Attorney

July 16, 1963 G. A. LALAK 3,097,621
BRAZING JIG FOR ELECTRON TUBE FABRICATION
Filed June 13, 1960 2 Sheets-Sheet 2
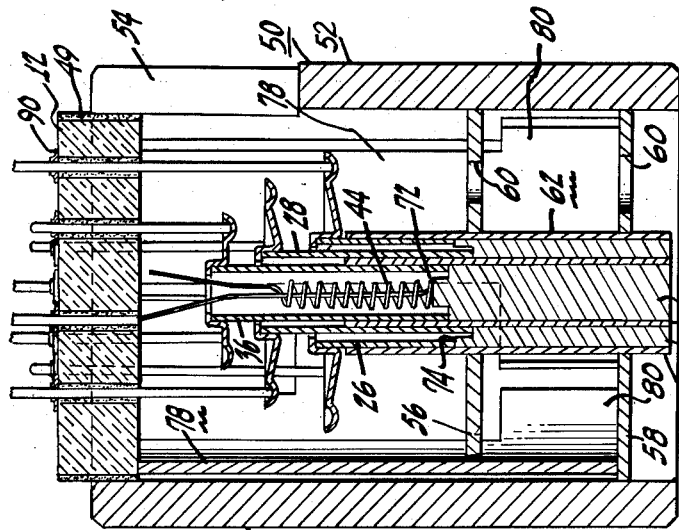
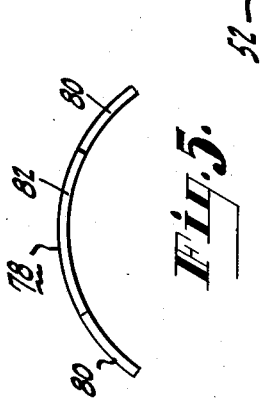
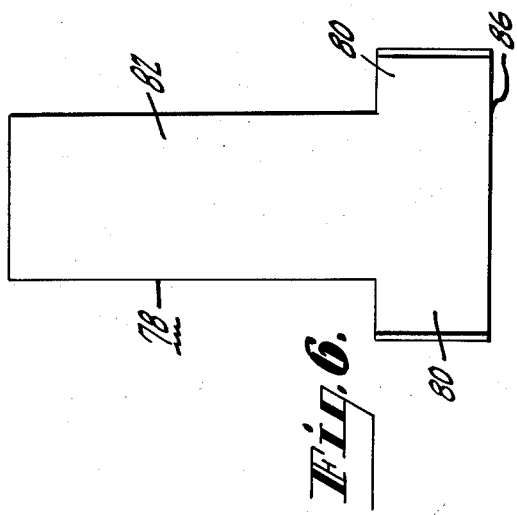
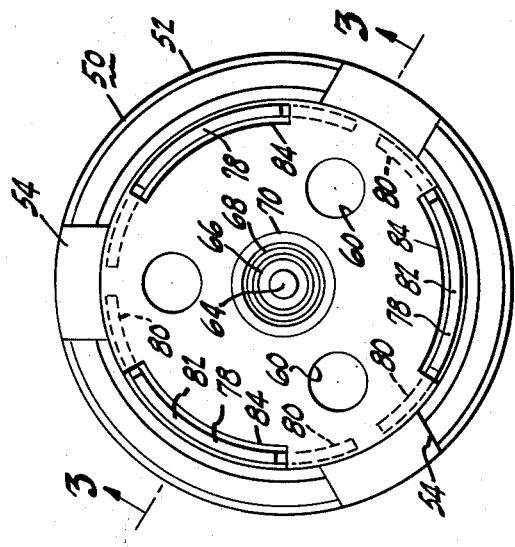
INVENTOR.
George A. Lalak
BY
William A. Zalesak
ATTORNEY United States Patent Office 3,097,621
Patented July 16, 1963

3,097,621
BRAZING JIG FOR ELECTRON TUBE
FABRICATION
George A. Lalak, Springfield, N.J., assignor to Radio Corporation of America, a corporation of Delaware
Filed June 13, 1960, Ser. No. 35,795
6 Claims. (Cl. 113—99)

This invention relates to a brazing jig for use in the manufacture of electron tubes.

The fabrication of one type of electron tube, hereinafter described, employs a jig for supporting a plurality of tube parts in predetermined loose contacting relationship during brazing operations. The coefficients of thermal expansion of the tube parts are different from each other and from the coefficient of thermal expansion of the jig material. A jig suitable for mass production of such a tube should not only avoid the problem of differential thermal expansion between the jig and the tube parts, which, as hereinafter described, may result in poor brazes, but it must also be rugged, accurate, and relatively inexpensive. No one prior art jig used in fabrication of electron tubes of the type in question has satisfied all of the requirements set forth above.

It is therefore an object of my invention to provide a new and improved brazing jig which is rugged, accurate, devoid of differential expansion problems, and yet which is considerably less costly than prior art jigs of the same general class.

A brazing jig according to my invention comprises a pair of apertured disks transversely mounted within a cylindrical opening in a housing. A jigging assembly preferably comprising concentric contiguous, i.e., radially stacked, tubular elements is mounted through the apertures of the disks. A plurality of sheet metal elements are mounted in the housing and extend longitudinally along the housing wall from one disk and through peripheral recesses in the other disk. The disks are preferably centrally apertured to disposed the jigging assembly concentrically within the housing. The sheet metal elements are preferably T-shaped and arcuate in transverse cross section and held captive within the housing by virtue of the wing portions of the T being disposed between the two disks. The jig is adapted to receive a plurality of tubular electron tube electrodes on the tubular jigging elements and to support a ceramic disk header wafer within the housing on the ends of the legs of the T inserts during brazing operations.

In the drawings:

FIG. 3 is a longitudinal section of a brazing jig according to my invention in which certain parts of the electron tube of FIG. 1 are disposed;

FIG. 4 is a plan view of the brazing jig of FIG. 3; and

FIGS. 5 and 6 are end and side elevation views, respectively, of the T-shaped inserts of the jig of FIGS. 3 and 4.

Figure 1:
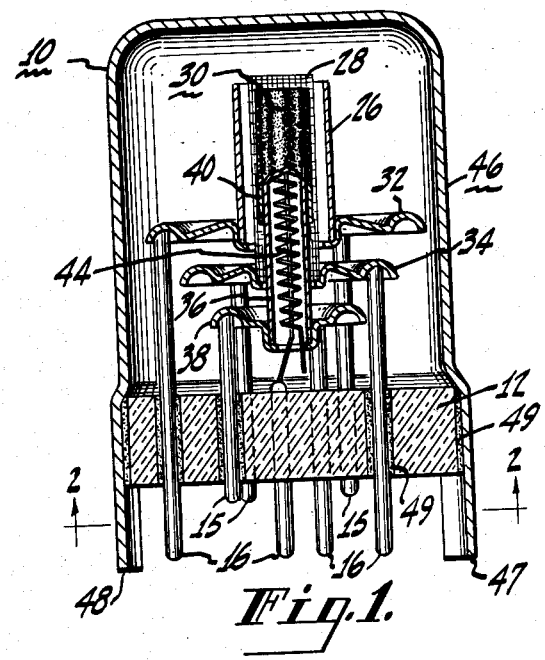
FIG. 1 is a longitudinal section of an electron tube suitable for assembly in the brazing jig of my invention.
Figure 2:
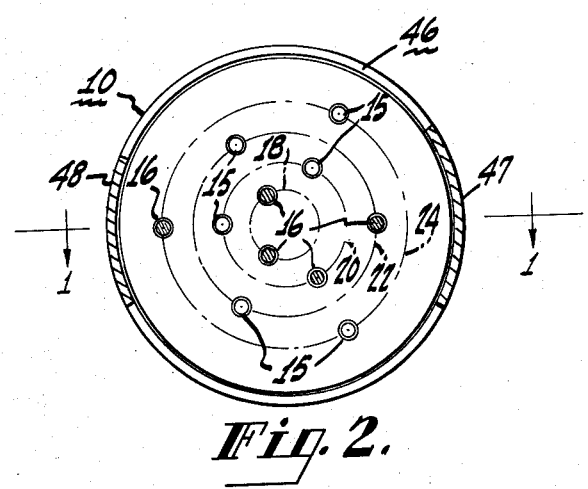
FIG. 2 is a transverse section taken along line 2—2 of FIG. 1.

In FIGS. 1 and 2, an electron tube 10 adapted to be fabricated in the brazing jig according to the invention is shown. The tube 10 includes a ceramic disk header 12 having a plurality of bores therethrough. A plurality of electrode support conductors 15 and lead-in conductors 16 are sealed in vacuum-tight relation in the bores.

As shown in FIG. 2, the bores, and hence conductors 15 and 16, are arrayed in four concentric circles 18, 20, 22, and 24 shown in phantom. Three bores are disposed in 120°, equidistant, relation on each of the circles. The bores in adjacent circles are angularly displaced 60° to provide maximum spacing therebetween.

The electron tube 10 comprises coaxial cylindrical anode, grid, and cathode electrodes 26, 28, and 30, respectively. The anode 26 is mounted on a radially extending flange 32, which is in turn mounted on one lead-in conductor 16 and two support conductors 15 which extend into bores on the outer circle 24. The grid electrode 28 is similarly mounted on a radially extending flange 34 which is in turn mounted on one lead-in conductor 16 and two support conductors 15 which extend into bores on the circle 22. The cathode 30 comprises a tubular cathode support sleeve 36 mounted on a radially extended flange 38, which is supported on one lead-in conductor 16 and two support conductors 15 extending into bores on the circle 20. The cathode 30 also includes a tubular emissive sleeve 40 which is disposed over the support sleeve 36, and which is coated with a suitable electron emissive material. A coiled heater 44 is disposed in the cathode support sleeve 36 and connects to a pair of lead-in conductors 16 which are sealed through two bores on the inner circle 18. A vacuum tight envelope is provided by a cup-shaped shell 46 which is sealed to the periphery of the ceramic disk header 12. The shell 46 includes a pair of extending arcuate tongues 47 and 48 which serve to protect the externally extending conductors 16 and facilitate socketing of the tube. Both of the conductors 16 connecting to the heater 44 extend through the ceramic header 12 and form terminal prongs. Only the one-lead-in conductor 16 of each of the set of three conductors connected respectively to the anode, grid, and cathode flanges extend through and beyond the ceramic header 12 to provide terminal prongs.

In one form of the tube 10, the conductors 15 and 16 and the side rods of the grid 28 are made of molybdenum; the cathode support sleeve 36 is principally "Nichrome" alloy; the anode 26 is nickel; and the flanges 32, 34, and 38 are steel.

In the fabrication of the electron tube 10, a metallic coating 49, such as molybdenum, is applied to the ceramic disk header 12 on its outer periphery and on the walls of the bores therein. Such a coating may be applied by any suitable-known metallizing process. It has been found expedient to coat all surfaces of the ceramic disk header 12 with molybdenum and then grind the two planar surfaces thereof to remove the coating therefrom. Thus, only the outer periphery and the walls of the bores are left with a metallized coating 49.

The support flanges 32, 34, and 38 are coated, such as by electroplating, with a brazing material, such as copper. The conductors 15 and 16 are either similarly electroplated or else have washers of brazing material fitted over them and against the header 12. Thus, when the tube parts are assembled, and the assembly is heated to a sufficiently high temperature, vacuum-tight brazed seals are effected between the conductors 15 and 16 and the ceramic disk header 12. Also, the flanges 32, 34, and 38 are brazed to their respective electrodes and conductors. The shell 46 is sealed to the periphery of the ceramic header 12 in a final hard soldering step. The details of the brazing process will be more fully described with reference to FIGS. 3 and 4.

FIGS. 3 and 4 illustrate one form of a brazing jig made according to my invention. This jig is particularly suitable for assembling the electron tube shown in FIGS. 1 and 2. The jig 50 comprises an outer generally cylindrical hollow housing 52. The housing 52 need not be circumferentially continuous at all longitudinal points. It is preferred that the housing 52 be provided with a plurality of longitudinal slots 54 therein to facilitate the flow therethrough of a reducing gas such as hydrogen during the brazing operation. The longitudinal slots 54 extend from the top of the housing 50 downwardly to any desired extent so long as the housing remains sufficiently rigid.

Two centrally apertured support disks 56 and 58 are transversely mounted within the cylindrical housing 52 in interference fits. One or more openings 60 are provided in both the upper support disk 56 and the lower support disk 58 for the purpose of facilitating an adequate flow of the reducing gas atmosphere through the jig during the brazing operation.

A jigging assembly 62 is disposed through the central apertures of the support disks 56 and 58 and is mounted therein in an interference fit. The jigging assembly 62 comprises a central post 64, an inner jigging cylinder 66, a spacer cylinder 68, and an outer jigging cylinder 70. The inner and outer jigging cylinders 66 and 70 extend upwardly a predetermined distance beyond the upper ends of the center post 64 and the spacer cylinder 68 to partially expose the cylindrical surfaces thereof for the purpose of receiving tube parts thereon. The four elements 64, 66, 68, and 70 of the jigging assembly 62 are assembled with interference fits therebetween.

As shown in FIG. 3, the jigging assembly 62 is adapted to receive the cathode support sleeve 36, the grid 28, and the anode 26 in a desired spaced relationship. The inner jigging cylinder 66 is of such internal diameter that the cathode support sleeve 36 is snugly received therewithin. The outer diameter of the inner jigging cylinder 66 is such that the grid 28 is snugly received therearound. The inner diameter of the outer jigging cylinder 70 is such that the anode 26 is snugly received therewithin. The wall thickness of the inner jigging cylinder 66 thus determines the spacing between the cathode support sleeve 36 and the grid 28. The wall thickness of the spacer cylinder 68 is such that the desired grid-to-anode spacing is provided. The center post 64 and the spacer cylinder 68 are provided with stepped ends 72 and 74, respectively, so as to properly longitudinally locate the anode 26, grid 28, cathode sleeve 36, and the heater coil 44.

The ceramic disk header wafer 12 of the electron tube 10 is received within the cylindrical housing 52 to position it concentrically with respect to the electrodes 26, 28, and 36. The ceramic header wafer 12 is supported on the ends of a plurality of elongated sheet metal inserts 78. The inserts 78 are generally arcuate in transverse cross section as shown in FIG. 5 and are T-shaped so as to include wing portions 80 and a leg portion 82.

In accordance with one feature of my invention, the T-shaped inserts are made of standard sheet metal stock. Thus, they can be easily fabricated by a punching or stamping operation and formed to the desired arcuate contour.

Three of the T inserts are provided in the jig 50 and are disposed within the cylindrical housing 52 with their wing portions 80 between the upper and lower support disks 56 and 58. The upper support disk 56 is provided with three arcuate slots on peripheral recesses 84 through which the leg portions 82 of the inserts 78 extend. The longitudinal upward extent of the T inserts is such as to longitudinally support the ceramic disk header 12 in a desired axial relationship with respect to the electrodes 26, 28, and 36. By virtue of the relatively long bottom surface 86 of the inserts 78, the inserts are easily maintained in a precise upright relationship. Also, by virtue of the captivation of the wing portion 80 of the inserts between the upper and lower support disks 56 and 58, the inserts are prevented from falling out of the jig during handling thereof. Yet the inserts 78 are suitably loosely contained within the jig so as to freely accommodate any differential expansion.

The inserts 78 are provided of a material which will exhibit the same or less axial thermal expansion than the electron tube parts disposed in the jig 50. On the other hand, the remainder of the jig parts may be provided of material which is most suitable to being fabricated and which can best be surface conditioned to prevent sticking of the tube parts thereto during the brazing operation. In the preferred embodiment of the jig 50, the inserts 78 are made of molybdenum and the remainder of the jig parts are made of an alloy which is approximately 80 percent nickel and 20 percent chromium with trace impurities and which is sold commercially as "Nichrome" or "Topher A." The nickel-chromium alloy parts are provided with an oxidized surface.

In the assembly and fabrication of the electron tube 10, the jig 50 is oriented with the open end up. As shown in FIG. 3, an anode 26, a grid 28, and a cathode support sleeve 36 are loaded into contact with the inner and outer jigging elements 66 and 70. Such loading may be facilitated with a loading device (not shown) which is jigged against the rim of the housing.

An anode flange 32, a grid flange 34, and a cathode flange 38 are deposited in the order named on their respective electrodes. Alternatively, the flanges and electrodes may be assembled as units and simultaneously placed in the jig, the anode and its flange being inserted in the jig first. The two legs 76 of the heater coil 44 are attached to a pair of lead-in conductors 16 which are inserted in proper bores in the ceramic disk header 12. The remaining nine conductors, one lead-in conductor 16, and two supporting conductors 15 for each electrode flange, are loaded into their proper bores in the header 12. The header 12 is then placed in the housing 52 on top of the inserts 78. The conductors 15 and 16 are such that they fit snugly within the bores of the header but are nevertheless slidable therein so that they may drop downwardly and into contact with their respective electrode flanges. Prior to such assembly the ceramic header 12 has been provided with metallic coatings 49 on the outer periphery and the walls of the bores as hereinbefore described. The conductors 15 and 16 and the three electrode support flanges 32, 34, and 38 have been previously provided with a suitable brazing material such as copper washers 90 disposed over the ends of the conductors.

The assembly of the jig 50 and the electron tube parts shown in FIG. 3 are then inserted in a furnace and heated in a reducing atmosphere to a temperature sufficient to melt the brazing material on the conductors 15 and 16 and on flanges 32, 34, and 38 and fuse the electron tube parts together.

Following this brazing operation, the cathode emissive sleeve 40 is placed over the cathode support sleeve 36 and the envelope shell 46 is fitted into contact with the ceramic header 12. A preformed ring of a hard solder is positioned in contact with the tube shell 46 and the ceramic header periphery. This assembly results in a complete tube assembly which is then subjected to a final furnace heating in vacuum. This final processing step serves to evacuate the tube, sinter the cathode emissive sleeve 40 to the cathode support sleeve 36, and solder the shell 46 to the periphery of the header 12. The temperature employed in this final step is substantially below the previous brazing temperature. Accordingly, the previously made brazes are not adversely affected.

In the brazing of the subassembly of the electron tube 10 of FIG. 3, both the tube parts in the jig and the jig itself expand axially. If the axial expansion of that portion of the jig which supports the disk header 12 is greater than the total axial expansion of the tube parts and that portion of the jig which supports them, the ceramic header 12 will be lifted upwardly and possibly carry the conductors 15 and 16 out of contact with their respective electrode flanges 32, 34, and 38. If this lifting occurs before the brazing is completed, the conductors 15 and 16 may not become attached to their respective flanges. Such has been the problem with some prior art brazing jigs.

In prior art jigs which have such differential expansion problems, it is known to vibrate the assembly during brazing thereof to cause the conductors 15 and 16 to settle downwardly upon their respective flanges. However, such vibrating is undesirable for at least two reasons. First, it is difficult and expensive to facilitate mass production equipment with suitable vibrators. Second, excessively long conductors 15 and 16 must be provided in order to give suitable mass to the conductors so that they will be settled downwardly by the vibration. Providing of excessively long conductors is wasteful and expensive.

In one type of prior art jig, differential expansion problems are avoided even without the necessity of vibration by making the entire jig of a suitable low expansion material. However, suitable low expansion materials, such as molybdenum, tungsten, and ceramic, are, generally speaking, expensive and costly to machine. Moreover, the preferred material, molybdenum, cannot be easily surface conditioned to prevent sticking of the tube parts thereto.

In another type prior art jig hereinbefore briefly described, tubular jigging elements are supported from the base of a cup-like housing, and the part of the jig which serves as the support member for the ceramic header 12 is made of a material which has an axial thermal expansion equal to or less than the total axial thermal expansion of the tube parts, i.e., the electrodes, their flanges and their conductors, assembled in the jig. Specifically, a hollow cylindrical insert of low expansion material, e.g., molybdenum, is disposed within the housing and supports the disk header wafer. Such a jig, while effectively overcoming differential expansion problems, is likewise somewhat expensive because fabrication of the molybdenum hollow cylinder insert requires costly machining. Moreover, support of the jigging cylinders from one end only gives rise to the possibility of loss of concentricity through use and handling.

From the preceding description of the brazing jig 50 according to my invention, it will be appreciated that all of these problems are satisfactorily solved. By virtue of supporting the ceramic header 12 on the molybdenum inserts 78, the desired axial expansion relationships are obtained. That is, the axial thermal expansion per unit length, or coefficient of expansion, of the inserts 78 is no greater than that of the assembly of tube parts. Then too, since the molybdenum inserts are such that they can be fabricated by punching and stamping operations from standard flat sheet material they are relatively inexpensive. For example, use of three sheet metal T inserts according to my invention as opposed to a single machined hollow cylindrical insert of the prior art has reduced jig cost by a factor of one half. Moreover, according to my invention, increased ruggedness as compared to prior art jigs is provided by virtue of the spaced two-point support of the tubular jigging elements rather than a cantilever one point end support according to prior art construction.

I claim:

1. A brazing jig comprising a housing having a cylindrical opening therein, a pair of support disks mounted transversely within said opening in longitudinal spaced relationship with each other along the longitudinal axis of said cylindrical opening, each of said support disks having a central aperture therethrough, one of said support disks having a plurality of peripheral recesses therein, a cylindrical jigging assembly extending through the central apertures of and fixed to said support disks, and a plurality of elongated sheet metal inserts disposed within said housing, each of said inserts extending longitudinally along the wall of said cylindrical opening from the other of said disks and through one of said peripheral recesses in said one disk.

2. The brazing jig according to claim 1 and wherein said inserts have a lower coefficient of thermal expansion than does said housing.

3. A brazing jig comprising a housing having a generally cylindrical opening therethrough, a pair of centrally apertured support disks transversely mounted within said opening in axial spaced relationship with each other along the longitudinal axis of said cylindrical opening, a cylindrical jigging assembly extending through the apertures of said support disks and fixed thereto and comprising concentric tubular elements, and a plurality of T-shaped sheet metal inserts of arcuate transverse section mounted within said housing with the T-wing portions thereof held captive between said support disks, the leg portions of said inserts extending through one of said support disks and longitudinally along said housing and adjacent the wall of said opening.

4. The brazing jig according to claim 3 and wherein said inserts are molybdenum and the remainder of said jig is of a material having a greater coefficient of thermal expansion than does molybdenum.

5. A brazing jig adapted to receive in concentric radially spaced relationship a plurality of tubular electron tube electrodes and a disk header wafer coaxial with said electrodes and axially spaced therefrom, said jig comprising a hollow cylindrical housing, two centrally apertured support disks mounted transversely within said housing in axially spaced relationship with each other along the longitudinal axis of said cylindrical housing, one of said disks having a plurality of arcuate peripheral recesses providing a plurality of arcuate openings therethrough contiguous with said housing, a plurality of elongated sheet metal inserts of arcuate transverse cross section extending from between said disks through said arcuate openings to the other side of said one disk, said inserts having wing portions of greater arcuate extent than said arcuate openings disposed between said disks for holding said inserts loosely captive in place, and a cylindrical jigging assembly mounted on said disks within the central apertures thereof and comprising in concentric relationship a center cylinder and three tubular members, said jigging assembly including cylindrical surfaces adapted to receive from said other side of said one disk, said plurality of tubular electrodes in radially spaced concentric relationship, said jig being adapted to support said disk header wafer transversely within said housing on the ends of said inserts in axial spaced relationship with said electrodes.

6. A brazing jig adapted to receive in concentric radially spaced relationship a plurality of tubular electron tube electrodes and a disk header wafer coaxial with said electrodes and axially spaced therefrom, said jig comprising a hollow cylindrical housing having a plurality of longitudinal slots extending from one end thereof, first and second centrally apertured support disks mounted transversely within said housing in interference fits in axially spaced relationship with each other along the longitudinal axis of said cylindrical housing, said first support disk being closer to said one end of said housing than is said second support disk, said first support disk having a plurality of arcuate peripheral recesses to provide a plurality of arcuate openings therethrough contiguous with the periphery thereof, a different one of a plurality of elongated sheet metal inserts of arcuate transverse cross section extending through said arcuate openings, said inserts having wing portions of greater arcuate extent than said arcuate openings to thereby hold said inserts loosely captive in place, said elongated inserts extending toward but short of said one end of said housing, and a cylindrical jigging assembly mounted through the central apertures of said support disks in interference fits therewith, said assembly comprising in concentric radially stacked relationship a center cylinder and three tubular members, said center cylinder and the middle one of said tubular members extending toward said one end of said housing given distance, both the inner and outer ones of said tubular members extending toward said one end of said housing substantially farther than either of said given distances but substantially short of the extent of said inserts, said inserts having a coefficient of thermal expansion less than that of the remainder of said jig, said jig being adapted when oriented with said one end of said housing upward to receive said plurality of tubular electrodes in radially spaced concentric relationship on cylindrical surfaces of said inner and outer tubular jigging members and in axial spaced relationship on end surfaces of said center cylinder and said middle tubular member and to support said disk header wafer transversely within said one end of said housing on the upper ends of said inserts in axial spaced relationship with said electrodes.

References Cited in the file of this patent

UNITED STATES PATENTS

| | | |
|---|---|---|
| 2,424,878 | Crook | July 29, 1947 |
| 2,433,339 | Brown | Dec. 30, 1947 |
| 2,445,766 | Derby et al. | July 27, 1948 |
| 2,527,983 | Brown et al. | Oct. 31, 1950 |
| 2,599,394 | Kohl | June 3, 1952 |
| 2,706,232 | Pilas | Apr. 12, 1955 |
| 2,917,812 | Wolke et al. | Dec. 22, 1959 |
| 2,919,128 | Blattel et al. | Dec. 29, 1959 |
| 3,007,760 | Knauf et al. | Nov. 7, 1961 |